United States Patent
Berkowitz et al.

(10) Patent No.: US 10,310,461 B2
(45) Date of Patent: Jun. 4, 2019

(54) ADAPTIVE POLLING IN ENERGY DISTRIBUTION SYSTEMS WITH DISTRIBUTED ENERGY STORAGE

(71) Applicant: S&C Electric Company, Chicago, IL (US)

(72) Inventors: Donald S. Berkowitz, Boquete (PA); Thomas Walker, Westerville, OH (US)

(73) Assignee: S&C Electric Company, Chicago, IL (US)

( * ) Notice: Subject to any disclaimer, the term of this patent is extended or adjusted under 35 U.S.C. 154(b) by 358 days.

(21) Appl. No.: 15/140,756

(22) Filed: Apr. 28, 2016

(65) Prior Publication Data

US 2016/0380438 A1 Dec. 29, 2016

Related U.S. Application Data

(60) Provisional application No. 62/186,167, filed on Jun. 29, 2015.

(51) Int. Cl.
*H02J 4/00* (2006.01)
*G05B 15/02* (2006.01)
(Continued)

(52) U.S. Cl.
CPC .............. *G05B 15/02* (2013.01); *H02J 3/32* (2013.01); *H04L 12/40032* (2013.01);
(Continued)

(58) Field of Classification Search
None
See application file for complete search history.

(56) References Cited

U.S. PATENT DOCUMENTS

| 4,847,782 | A | * | 7/1989 | Brown, Jr. .......... H02J 13/0086 307/38 |
| 6,900,556 | B2 | | 5/2005 | Provanzana et al. |

(Continued)

FOREIGN PATENT DOCUMENTS

WO 2013188517 A2 12/2013

OTHER PUBLICATIONS

The International Bureau of WIPO, International Preliminary Report on Patentability for International Application No. PCT/US2016/039935 dated Jan. 11, 2018.
(Continued)

Primary Examiner — Bernard G Lindsay

(57) ABSTRACT

Method of controlling distribution of energy within an energy distribution system and energy distribution systems are provided. An energy distribution system includes a central controller and one or more remote distribution control units. A method includes obtaining, with the central controller from the remote distribution control units, operational data indicating an operational condition of the energy distribution system. The method further includes comparing the operational condition to a polling rate threshold that indicates when the operational condition is approaching a condition threshold at which the central controller will operably control operation of the remote distribution control unit. The method further includes adjusting a polling rate at which the operational data is obtained in response to the operational condition crossing the polling rate threshold. The method yet further includes polling and controlling the remote distribution control unit with the central controller at the adjusted polling rate.

8 Claims, 3 Drawing Sheets

(51) Int. Cl.
*H02J 3/32* (2006.01)
*H04Q 9/00* (2006.01)
*H04L 12/40* (2006.01)
*H02J 3/38* (2006.01)
*H02J 13/00* (2006.01)

(52) U.S. Cl.
CPC ................. *H04Q 9/00* (2013.01); *H02J 3/38* (2013.01); *H02J 13/0006* (2013.01); *H02J 13/0072* (2013.01); *H04L 12/40* (2013.01); *H04Q 2209/60* (2013.01); *H04Q 2209/823* (2013.01); *Y02E 40/72* (2013.01); *Y02E 60/722* (2013.01); *Y04S 10/12* (2013.01); *Y04S 10/14* (2013.01)

(56) References Cited

U.S. PATENT DOCUMENTS

| | | |
|---|---|---|
| 7,050,311 B2 | 5/2006 | Lai et al. |
| 7,373,222 B1* | 5/2008 | Wright ............... H02J 3/14 700/20 |
| 2003/0204756 A1 | 10/2003 | Ransom et al. |
| 2004/0111226 A1 | 6/2004 | Brewster et al. |
| 2004/0254688 A1 | 12/2004 | Chassin et al. |
| 2008/0249826 A1 | 10/2008 | Tolnar et al. |
| 2009/0157835 A1 | 6/2009 | Thompson et al. |
| 2010/0262296 A1* | 10/2010 | Davis ............... G05B 15/02 700/275 |
| 2012/0243416 A1 | 9/2012 | Hussain et al. |
| 2014/0156093 A1 | 6/2014 | Brian et al. |

OTHER PUBLICATIONS

United States International Searching Authority, International Search Report and Written Opinion for International Application No. PCT/US2016/039935 dated Sep. 14, 2016.
The European Patent Office, Extended European Search Report for International Application No. PCT/US2016/039935 dated Nov. 6, 2018.

* cited by examiner

ADAPTIVE POLLING IN ENERGY DISTRIBUTION SYSTEMS WITH DISTRIBUTED ENERGY STORAGE

CROSS-REFERENCE TO RELATED APPLICATIONS

This application claims the benefit of U.S. Provisional Application No. 62/186,167 filed on Jun. 29, 2015. The disclosure of the above application is incorporated herein by reference.

TECHNICAL FIELD

This disclosure generally relates to adaptive polling in energy distribution systems, and more particularly relates to adjusting a polling rate of remote distribution control units in response to one or more operational conditions crossing their respective thresholds.

BACKGROUND

This disclosure describes embodiments of systems, controllers, and methods to provide improved control and coordination of a multiplicity of electric distribution grid-connected distribution units, such as energy storage units deployed over a geographically-dispersed area. The units may be very similar to those described in U.S. Pat. No. 6,900,556 and commonly referred-to under names such as Distributed Energy Storage (DES) and Community Energy Storage (CES). An alternative design of units that may be adapted, used, deployed or controlled in accordance with the embodiments herein described is described in U.S. Pat. No. 7,050,311 and referred-to as an "Intelligent transformer." In summary, these units are self-contained energy storage systems consisting typically of a storage battery capable of holding 25 kWH of energy or more, an inverter, and a local control system with a communication interface to an external central control system responsible for coordinating their function within the distribution grid. These external central control systems are commonly referred to under names such as the HUB controller or the Distributed Energy Management (DEM) controller. The system consisting of the controller and the storage units is commonly referred-to as a Virtual Power Plant. Under sponsorship of the Electric Power Research Institute (EPRI), the functional requirements for a very simple control system for coordinating the operation of these storage units have been cooperatively developed and placed in the public domain.

The primary function of the DES unit is to assist the utility in reducing peak demand (referred to commonly as "peak shaving" or "load following") to defer or eliminate a regional need for additional generating capacity. Other valuable features of the DES unit include the ability to provide reactive power compensation, to provide voltage support, to provide backup power for stranded customers when the main source of supply is temporarily unavailable, and to provide frequency support (ancillary services). An extensive description of the requirements of the basic DES unit, from the customer (electric distribution utility) point of view is contained in the EPRI DES Hub and Unit Functional Requirements Specifications. Other functions allow the DES unit to facilitate the connection of various renewable energy sources into the grid. This includes providing energy storage or buffering during periods of weak demand, and conversion from DC to AC and AC to DC.

In order to coordinate the functions of the remote DES units, the external central controller DEM requires communications between the DEM and each storage unit to obtain operational performance data and to send commands from the DEM to the storage units. The DEM may also be in communication with devices such as Transformer Breakers, Feeder Breakers, and/or Tap Controller power monitors. The DEM performs communications at regular intervals to evaluate information obtained and to send updates to the fleet. The DES is designed to target deployments that are highly distributed across a large number of locations, employing a variety of telecommunications solutions for communications. Such scattered distribution means that communications can be unreliable, low bandwidth, and potentially carrying high operating costs.

Accordingly, it is desirable to provide methods and systems for reducing the frequency of communications in highly distributed energy distribution systems. Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The embodiments, will best be understood by reference to the specification taken in conjunction with the accompanying drawing in which.

DETAILED DESCRIPTION

Figure 1A:
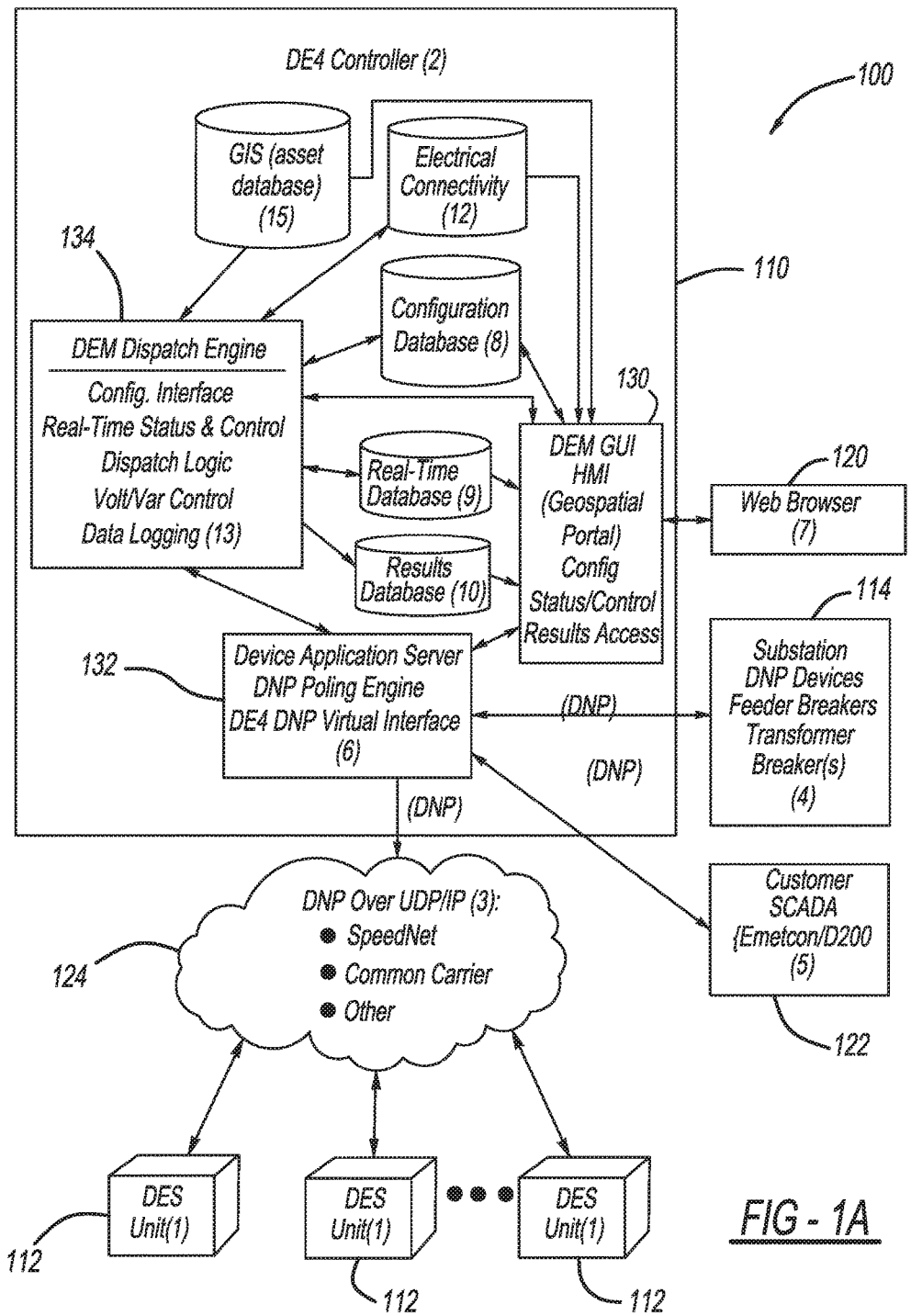
FIG. 1A and FIG. 1B are a simplified views of an energy distribution system in accordance with teachings of the present disclosure.

Methods of controlling distribution of energy within an energy distribution system and energy distribution systems are provided. An energy distribution system includes a central controller and one or more remote distribution control units. In one embodiment, a method includes obtaining, with the central controller from the remote distribution control unit, operational data indicating an operational condition of the energy distribution system. The method further includes comparing the operational condition to a polling rate threshold that indicates when the operational condition is approaching a condition threshold at which the central controller will actively control operation of the remote distribution control unit. The method further includes adjusting a polling rate at which the operational data is obtained in response to the operational condition crossing the polling rate threshold. The method yet further includes polling the remote distribution control unit with the central controller at the polling rate.

In another embodiment, the energy distribution system includes a distributed energy management (DEM) controller and a distributed energy storage (DES) unit. The method includes obtaining, with the DEM controller from the DES unit, operational data indicating electrical loading within the energy distribution system. The method further includes comparing the electrical loading to a polling rate threshold that indicates when the electrical loading is approaching a condition threshold at which the DEM controller will engage the DES unit for load reduction. The method yet further includes adjusting a polling rate at which the operational data is obtained in response to the electrical loading crossing the polling rate threshold. The method yet further includes polling the DES unit with the DEM controller at the polling rate.

In another embodiment, an energy distribution system includes a remote distribution control unit and a central controller in communication with the remote distribution control unit. The central controller is configured for obtaining, from the remote distribution control unit, operational data indicating an operational condition of the energy distribution system. The central controller is further configured for comparing the operational condition to a polling rate threshold that indicates when the operational condition is approaching a condition threshold at which the central controller will operably control operation of the remote distribution control unit. The central controller is yet further configured for adjusting a polling rate at which the operational data is obtained in response to the operational condition crossing the polling rate threshold. The central controller is yet further configured for polling the remote distribution control unit with the central controller at the polling rate.

Energy distribution systems that utilize methods for adaptive polling in energy distribution systems allow communications to be minimized by modifying the rate at which devices (storage units or monitoring points) are accessed. The systems typically include a central controller (e.g., a Distributed Energy Management (DEM) unit) and a fleet of remote distribution control units e.g., Distributed Energy Storage (DES) units, Community Energy Storage (CES) units). In one embodiment of these systems, load is managed independently on each single-phase takeoff point (or "tap") from the three-phase distribution system feeders. The adaption is highly configurable based on subsets of the storage deployment, by individual tap. The rate of polling for each tap is individually configurable to switch between a slow rate and a fast rate. When the DEM determines that a particular tap needs to be actively managed, the DEM operates at the fast polling rate in order to provide highly responsive control of the units on that particular tap. When a tap does not require active management then the polling rate operates at a slower rate.

Because not all taps will behave the same and will not require active management at the same times, the adaptive polling feature permits the DEM to anticipate the need for active management by configuring a threshold below the actual operating limit for each tap, thus permitting the fast and slow rates to be dramatically different (e.g., by a factor of 10, 100 or more). When configured for a particular implementation, adaptive polling reduces the total fleet communications by supporting different fast and slow rates for devices in the fleet, allowing different settings for each tap to optimize communications across the entire fleet, anticipating the need for fast polling to support responsive active management, and maintaining fast polling for a configurable period that supports utilization of charging opportunities.

Referring now to FIG. 1A, an energy distribution system 100 is illustrated in accordance with teachings of the present disclosure. Energy distribution system 100 includes a Distributed Energy Management (DEM) controller 110, Distributed Energy Storage (DES) units 112, and one or more substations containing various transformers and breakers (substation equipment, 114). DEM controller 110 is a central controller that may interface with a display interface/web browser 120, a SCADA system 122, and a communications network 124. Connectors depicted in the drawings indicate information exchange between components. In the example provided, data from the substation equipment does not actively contribute to the energy management decision making. In some embodiments, energy management decisions are made based upon substation, transmission system or generation-based conditions. DES units 112 are assembled or prepackaged components or boxes including energy storage modules (batteries in the present system). The system could use virtually any form of energy storage, including kinetic, capacitive, chemical, etc. as long as it is locally-convertible by the unit to electrical energy on demand. DES units 112 also include four-quadrant inverters and digital computer-based control with the ability to communicate to the outside world and DEM controller 110 through communications network 124. In the example provided, DES units 112 utilize the open standard DNP3 communication protocol to communicate with DEM controller 110, although modern computer technology provides a wide variety of application protocols that could be used. Since DES units 112 are dispersed over a wide geographic area, communications network 124 is preferentially utilized to facilitate the information exchange with DEM controller 110. In the example provided, communications network 124 is a telecommunications network that enables communication to highly distributed remote DES units 112. In other embodiments, radio frequency systems (e.g., S&C Electric Company's Speed-Net™ radio system) may be used for communications, as can a wide variety of other communication products using radio or any other suitable media.

Figure 1B:
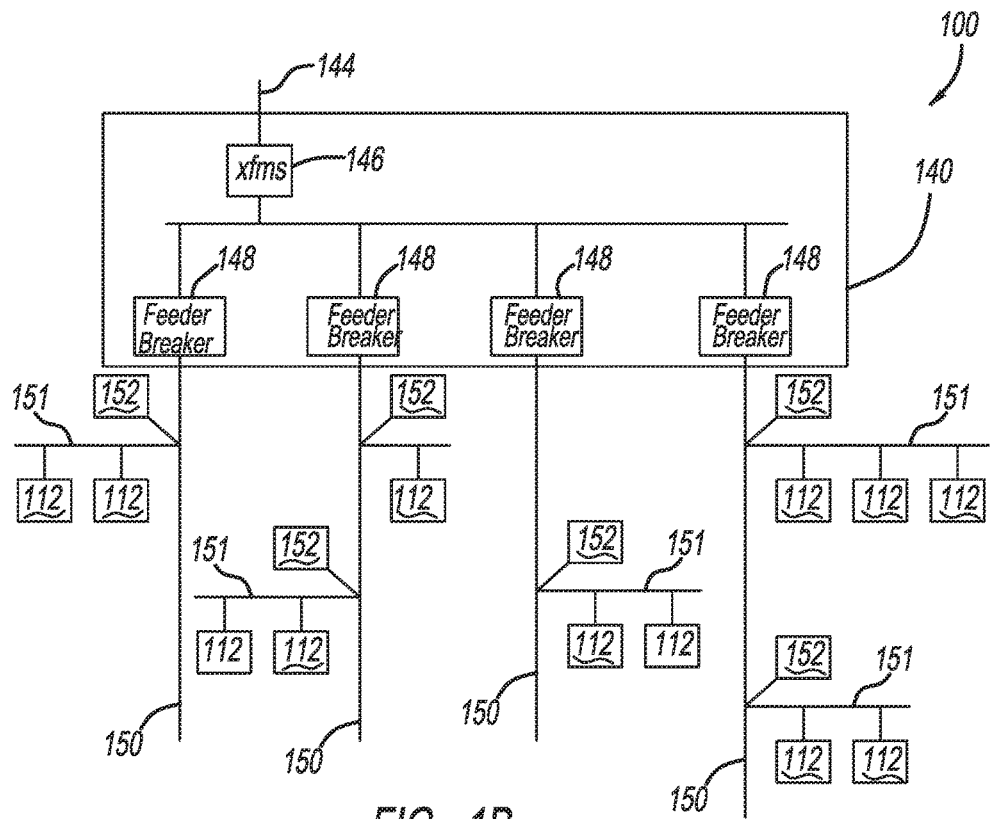

FIG. 1B shows the typical distribution system arrangement that may be managed by DEM controller 110. Feeders, 150, leaving the substation carry power in three phases out to the distribution system. Single phase taps (151) leave the Feeders at various points. Some of these taps are very long (dozens of miles) and may be heavily loaded in relation to their capacity. Those taps are selectively controlled on an individual basis by the DEM controller. In the example provided, each of the managed taps is outfitted with a monitoring point 152 at the head of the tap. The monitoring point measures load at the head of the tap and the DEM controller seeks to keep that load below a predetermined threshold by discharging power from the storage units 112.

Figure 3:
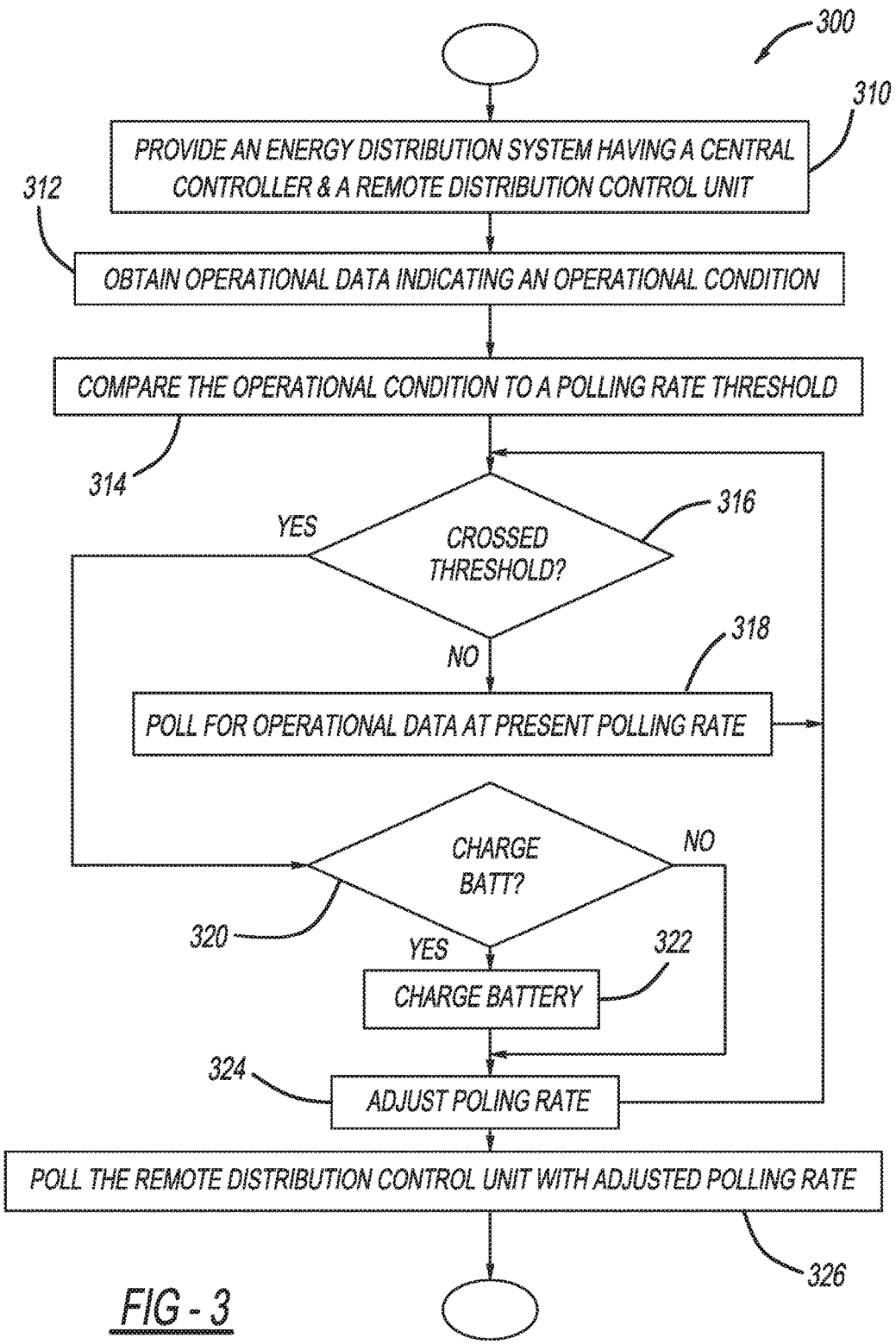
FIG. 3 is a flow diagram of a method for adaptive polling executed by the central controller of the energy distribution system of FIG. 1A in accordance with teachings of the present disclosure.

DEM controller 110 executes energy dispatch and coordination functions and performs operations of the method illustrated in FIG. 3. In some embodiments, DEM controller 110 is provided as a pre-packaged, self-contained, rack mountable, PC-based server appliance with internal software components organized using a service-oriented architecture (SOA). DEM controller 110 is primarily self-contained in that it is able to operate and dispatch energy-related operating commands and data without external components other than DES units 112 and communications network 124. The DEM may or may not also communicate with the substation equipment 114.

The DEM, can be flexibly configured to control to many different kinds of setpoints:
1) Substation-sensed distribution system properties
2) A feeder tap which could begin on a single phase of the feeder anywhere between the substation and the end of the feeder.
3) A general system setting, such as "discharge all batteries at the same proportional rate.

4) Any other sensed location that we might want to control load at.

The point here is that the location and nature of the sensing points is not significant to this patent application.

In the example provided, SCADA system 122 is included to allow the distribution operators to monitor and manage some features of DEM controller 110. For example, the operators have the capability to enable or disable the energy management features of the DEM.

A more fully-functioned interface, relative to the distribution operator's SCADA system 122 is a local Human Machine Interface (HMI) 130 that can be directly accessed in the substation via a local keyboard and display interface/web browser 120 or remotely accessed using a variety of computing methods. The local HMI 130 provides full control over the operation of the system.

Internal to DEM controller 110 are several additional/optional individual software components. The Device Application Server (DAS) 132 provides a DNP3 protocol compatible interface to external devices including substation equipment 114 mentioned above and DES units 112 via communications network 124. DAS 132 provides a service-oriented architecture for exchanging data and control functions between applications internal to DEM controller 110 and DAS 132. DAS 132 also provides translation between application-oriented, named data values and the numeric identification of DNP3 points. DAS 132 receives DNP3 poll requests and responds using its own cached data. DEM controller 110 applications can populate the cache with the appropriate data. The DNP device description for these "virtual" devices is configured into DAS 132 and the API to DAS 132 allows DAS 132 to either respond to external requests for data from the data stored in its cache, or to transmit the request to the DEM controller application.

Control commands from external applications are transmitted directly through the virtual device and DAS 132 to a DEM dispatch engine 134. The DNP protocol implementation in DEM controller 110 is described above for completion. Alternative designs incorporate the DNP protocol directly in the DEM controller application or could use an entirely different communication protocol to exchange data with other applications and devices or could use any possible combination thereof. DEM Dispatch Engine 134 provides coordination and control of both real and reactive power flow going into and out of the individual DES units 112.

FIG. 1B is a simplified diagram illustrating energy distribution system 100 with DES units 112. Power to the distribution substation, or "station" 140, is fed by a transmission line 144 that enters station 140 and goes directly into a station transformer 146. At the entry to the transformer, current and voltage sensing elements (not depicted) provide inputs to a relay providing protection for the transformer as well as power flow metering elements used by the DEM dispatch engine 134. In the example provided, a single transformer supplying all of the feeder circuit breakers 148 is illustrated for simplicity, although some embodiments have multiple transformers supplying the feeders. Transformer 146 typically feeds multiple feeder circuits, each with its own circuit breaker 148. Any number of feeders may be employed in any given embodiment. It should be noted that the individual circuits are shown each as a single line, although power is actually supplied as three separate phases. Sensing is provided individually on each phase.

Figure 2:
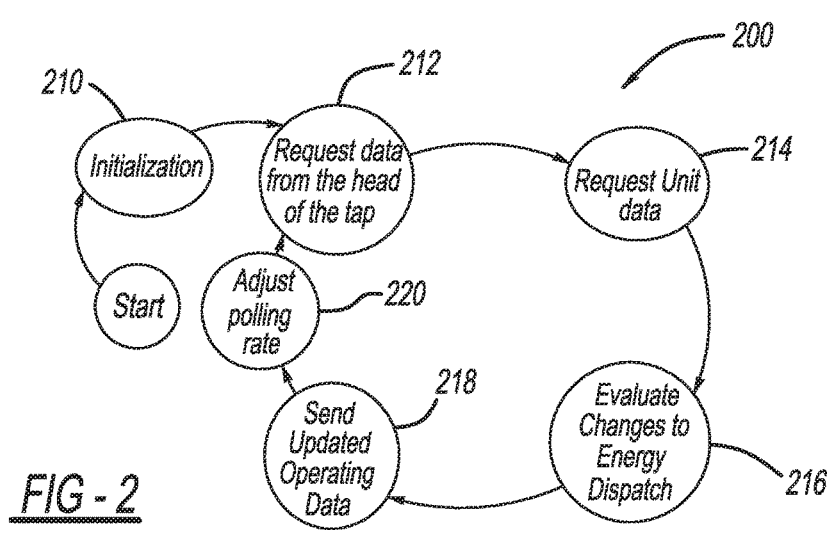
FIG. 2 is a graphic illustration of a control loop executed by a central controller of the energy distribution system of FIG. 1A.

Referring now to FIG. 2, a simplified diagram of a control loop 200 performed by DEM controller 110 is illustrated in accordance with the present disclosure. DEM controller 110 includes an energy dispatch function, executed by DEM dispatch engine 134 as control loop 200 in the example provided. DEM controller 110 includes a DNP polling engine and internal cache. Timing of polling is determined by whether or not the destination device is a station device or a field device, and is also based at least in part on the adaptive polling rate determined according to the method of FIG. 3, as discussed below. In the example provided, the DEM maintains one control loop for each single-phase tap. Each control loop operates completely independently.

During initialization state 210, DEM dispatch engine 134 accesses a master database and reads a configuration and last known operating state to determine, for example, if its dispatch functions are supposed to be enabled or disabled. During "Request Data from the Head of the Tap" state 212, DEM dispatch engine 134 requests a Class 0 DNP poll of monitoring point 152 of the tap head to retrieve data regarding the monitored load at the head of the tap.

During "Request Unit Data" state 214. DEM dispatch engine 134 requests a similar sequence as used for tap head Data, to request a Class 0 Poll of all DES units on the tap. In the example provided, states 212 and 214 are executed as quickly as possible, sending requests in parallel to all devices without waiting for responses, subject to the specific communication requirements of each of the channels and devices. For example, substation equipment on serial lines must be polled one at a time, with responses processed for each poll request before the next device on that channel can be polled. However, for devices such as DES units that are deployed in an IP-based, wide area network, requests for all units can be sent as quickly as the requests can be accepted over the Ethernet interface, and responses are then processed as they arrive. DEM dispatch engine 134 waits either for all responses to be received or for a predetermined time and then combines reported updates from devices which did respond along with last known states for devices which did not respond to the poll. The DEM then advances to the next state.

During "Evaluate Changes to Energy Dispatch" state 216, DEM dispatch engine 134 allocates both real and reactive power to/from DES units 112 using the received updated energy and performance data from all required sensing points. The allocation may be based on any known allocation methods, as will be appreciated by hose with ordinary skill in the art.

During "Send Updated Operating Data" state 218, DEM dispatch engine 134 transmits the updated real and reactive power requirements and operating information to each DES unit 112 on the tap and then waits a predetermined time for a DNP confirmation. Analog and state data are sent as DNP analog and control outputs. Along with these data the current time from DEM controller 110 is sent for synchronization.

During "Adjust Polling Rate" state 220, DEM dispatch engine 134 adjusts the polling rate at which state 212 and state 214 are repeated. For example, DEM dispatch engine 134 may adjust the polling rate according to the method illustrated in FIG. 3.

Referring now to FIG. 3, a method 300 for adaptive polling in energy distribution systems is illustrated. In the example provided, method 300 is implemented by DEM controller 110 where a DES fleet is deployed with DES units associated with a Tap Control at the tap head of a group of DES units. The Adaptive Polling Feature is configured to each tap recognizing the Tap Control and its associated units. The DEM Dispatch Engine is designed to manage the communications and evaluation interval (and associated polling rate) separately on a tap by tap basis.

For each tap there is a configurable tap Demand Limit. The units are commanded as required to meet changing conditions measured by the tap control, holding the tap demand to the configured limit. Initially the tap will be evaluated at the slow rate while the demand is below the Demand Limit. As demand increases and the Demand Limit is approached, a configured threshold is crossed and the tap transitions to the fast polling rate. This anticipation of active management assures that accurate and adequate data are available at the onset of the storage engagement in load reduction. The DEM then maintains that fast polling rate for that tap until the demand on the tap falls below the demand limit.

The feature may also be configured to sustain the fast polling rate for an additional period of time. This permits the DEM to take advantage of opportunities to charge the units on the tap if demand is sufficiently low during that additional time period.

In some embodiments, method 300 may be utilized for other types of storage deployments, including other storage strategies such as PV Integration or peak shaving, or with other storage formats. In some embodiments, intelligent switches are polled using the adaptive polling feature to reconfigure the energy distribution system, mainly for reliability. In some embodiments, method 300 is employed for Volt-VAR control, which is for power factor correction, as will be appreciated by those with ordinary skill in the art.

Operation 310 provides an energy distribution system having a central controller and a remote distribution control unit. As used herein, the term "remote distribution control unit" encompasses DES units 112 and monitoring point 152 of the tap head, as well as any similar devices that are polled by a central controller for operational conditions of the energy distribution system. For example, energy distribution system 100 with DEM controller 110, monitoring point 152 of the tap head, and DES units 112 may be provided. Operation 312 obtains operational data indicating an operational condition of the energy distribution system. For example, DEM dispatch engine 134 of DEM controller 110 may obtain loading data from DES units 112 and/or from feeder circuit breakers 148 in state 212 and 214. In some embodiments, obtaining the operational data includes sensing the operational condition (e.g., an electrical loading demand) at the remote distribution control unit.

Operation 314 compares the operational condition to a polling rate threshold that indicates when the operational condition is approaching a condition threshold at which the central controller will actively control operation of the remote distribution control unit. For example, the condition threshold may be a loading demand limit at which DEM controller 110 will engage DES units 112 to reduce loading on a tap. In such an example, the polling rate threshold is a loading demand that is lower than the loading demand limit. The difference between the condition threshold and the polling rate threshold may be preselected in software of the central controller, may be based on a present or averaged rate of change of loading, or may be selected based on other suitable factors and methods. The purpose is to anticipate the need for active control, providing adequate operational data for optimal performance at the onset of the active control session.

Operation 316 determines whether the operational condition crossed a threshold. For example, DEM controller 110 may determine whether electrical loading conditions crossed a polling rate threshold that is set below the demand limit for a tap. The operational condition may cross the polling rate threshold by exceeding or by dropping below the threshold.

When the operational condition does not cross a threshold, method 300 proceeds to operation 318 to continue polling for operational data at the present polling rate without adjustment.

When the operational condition has crossed a threshold in operation 316, method 300 proceeds to operation 320 to determine whether to charge a battery. For example, when electrical loading indicated by DES unit 112 is below the polling rate threshold, DEM 110 may command DES unit 112 to charge a battery of the DES unit 112 in operation 322.

When the battery is not to be charged, method 300 proceeds to operation 324 to adjust the polling rate that the central controller uses to obtain operational data from the associated devices. In other words, a polling rate at which the operational data is obtained is adjusted in response to the operational condition crossing the polling rate threshold. For example, DEM controller 110 may increase the polling rate in response to the operational condition exceeding the polling rate threshold and poll a particular tap head monitoring point 152 and associated DES units 112 at the adjusted polling rate in operations 324 and 326. Conversely, DEM controller 110 may decrease the polling rate in response to the operational condition decreasing below the polling rate threshold.

In the example provided, the polling rate may be adjusted between a "slow" polling rate and a "fast" polling rate. The slow polling rate is a rate at which the central controller polls the remote distribution control unit when the operational condition is not likely to reach the condition threshold. In some embodiments, the polling rate is adjustable between many more values and may be incrementally adjustable.

The remote controller polls the remote distribution control unit in operation 326 using the adjusted polling rate. In the example provided, polling the remote distribution units includes establishing communications across a telecommunications network. For example, DEM controller 110 in state 212 and/or state 214 may poll DES units 112 and/or monitoring point 152 at the head of the tap at the polling rate set in state 220.

It should be appreciated that method 300 may include other operations previously described with reference to FIGS. 1-3. For example, method 300 may further include controlling operation of the remote distribution control unit in response to the operational condition crossing the condition threshold as described with reference to DEM dispatch engine 134. In the example provided, controlling operation of the remote distribution control unit includes engaging an energy storage unit to reduce the electrical loading demand. As described above and appreciated by those with skill in the art, controlling operation of the remote distribution control may include reconfiguring an electrical circuit using distributed switches, may include implementing Volt-VAR control for power factor correction, or may include other suitable intelligent system control in energy distribution systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling distribution of energy within an energy distribution system, the energy distribution system including a distributed energy management (DEM) controller, a tap head associated with a single phase takeoff, and at least one distributed energy storage (DES) unit coupled to the tap head, the method comprising:
   obtaining, at regular intervals at a current polling rate, with the DEM controller from at least one of the tap head and the DES unit, operational data indicating electrical loading demand within the energy distribution system;
   comparing the electrical loading demand to a polling rate threshold that indicates when the electrical loading demand is approaching an electrical loading demand condition threshold at which the DEM controller will engage the DES unit for load reduction of the electrical loading demand, wherein the electrical loading demand threshold is greater than the polling rate threshold;
   increasing relative to the current polling rate, in response to the electrical loading demand crossing the polling rate threshold, the polling rate at which the operational data is obtained at regular intervals by the DEM controller; and
   polling the at least one of the DES unit and the tap head with the DEM controller at the polling rate.

2. The method of claim 1, further comprising decreasing the polling rate in response to the electrical loading demand decreasing below the polling rate threshold.

3. The method of claim 1, wherein polling the at least one of the tap head and the DES unit includes establishing communications across a telecommunications network.

4. The method of claim 1, further comprising engaging the DES unit in load reduction in response to the electrical loading demand crossing the electrical loading demand condition threshold.

5. An energy distribution system comprising:
   a tap head associated with a single phase takeoff;
   a remote distribution control unit coupled to the tap head, wherein the remote distribution control unit is a distributed energy storage (DES) system; and
   a central controller in communication with the remote distribution control unit, wherein the central controller is a distributed energy management (DEM) system, the central controller configured for:
      obtaining, at regular intervals at a current polling rate from at least one of the tap head and the remote distribution control unit, operational data indicating electrical loading demand of the energy distribution system;
      comparing the electrical loading demand to a polling rate threshold that indicates when the electrical loading demand is approaching an electrical loading demand condition threshold at which the central controller will operably control operation of the remote distribution control unit for load reduction of the electrical loading demand, wherein the electrical loading demand condition threshold is greater than the polling rate threshold;
      increasing relative to the current polling rate, in response to the electrical loading demand crossing the polling rate threshold, the polling rate at which the operational data is obtained at regular intervals by the central controller; and
      polling at least one of the tap head and the remote distribution control unit with the central controller at the polling rate.

6. The energy distribution system of claim 5, wherein the central controller is configured for decreasing the polling rate in response to the electrical loading demand decreasing below the polling rate threshold.

7. The energy distribution system of claim 5, wherein polling the remote distribution control unit includes establishing communications across a telecommunications network.

8. The energy distribution system of claim 5, wherein the DES system is configured for sensing the electrical loading demand.

* * * * *